US007013004B1

(12) United States Patent
Edwards

(10) Patent No.: US 7,013,004 B1
(45) Date of Patent: Mar. 14, 2006

(54) SYSTEMS AND METHODS TO COMPARE OPERATIONAL STATUSES OF SWITCH FEATURE PACKAGES

(75) Inventor: Michael L. Edwards, Madison, MS (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 664 days.

(21) Appl. No.: 09/960,318

(22) Filed: Sep. 24, 2001

(51) Int. Cl.
   *H04M 7/00* (2006.01)
   *H04M 3/42* (2006.01)
(52) U.S. Cl. .............................. 379/219; 379/201.02
(58) Field of Classification Search .......... 379/201.01, 379/112.01, 219, 201.02; 703/21
See application file for complete search history.

(56) References Cited

U.S. PATENT DOCUMENTS

| | | | | |
|---|---|---|---|---|
| 5,337,351 A | * | 8/1994 | Manabe et al. | 379/201.02 |
| 5,448,631 A | * | 9/1995 | Cain | 379/201.1 |
| 5,715,303 A | * | 2/1998 | Marks et al. | 379/112.01 |
| 6,185,519 B1 | * | 2/2001 | Lin et al. | 703/21 |

* cited by examiner

*Primary Examiner*—Ahmad F. Matar
*Assistant Examiner*—Thjuan P. Knowlin
(74) *Attorney, Agent, or Firm*—Withers & Keys, LLC

(57) ABSTRACT

Embodiment of the present invention relates to systems and methods for comparing feature package operational statuses of two or more switches. In an embodiment, the system includes a first switch and a second switch. The first switch includes a first set of features packages, and the second switch includes a second set of feature packages. The system also includes a computer coupled to the first switch and to the second switch. The computer is to receive a first set of feature package information and a second set of feature package information. The first set of feature package information corresponds to the first set of feature packages, and the second set of feature package information corresponds to the second set of feature packages. The computer is to compare the first set of feature package information and the second set of feature package information.

48 Claims, 14 Drawing Sheets

| FEATURE PACKAGE CODE | FEATURE PACKAGE NAME | FEATURE PACKAGE ENABLED IN FIRST SWITCH? | FEATURE PACKAGE ENABLED IN SECOND SWITCH? |
|---|---|---|---|
| AIPXYENH | ASI PROXY ENHANCEMENTS | N | Y |
| AMA2ACE | AMA FOR TYPE 2 CELLULAR | Y | N |
| ANI67TK | ANI6/ANI7 TRK GRP OR SFG | N | Y |
| BASFGBC | COMPLIANT FGB CIC EXPANSION | N | Y |
| BRCS2LN | BRCS II | Y | N |
| BRC1CSL | BRCS CUSTOMIZATION PER SLICE | Y | N |
| BRC1CSM | BRCS I CUSTOMIZATION | Y | N |
| CCSQRTU | CCS7 Q.931/SS7 INTERWORKING | N | Y |
| C7NIRTU | CCS7 NETWORK INTERCONNECT | N | Y |
| FANIPE | FLEXIBLE ANI PROVISIONING ENH. | Y | N |
| FRACDS1 | ACCESS TO NXDS0 | N | Y |
| FRAC3T6 | FRACTIONAL DS1 (3 - 6 DS1) | N | Y |
| FRADS12 | 2ND DS1/D-CH ACCESS TO NXDS0 | N | Y |
| FRA7T20 | FRACTIONAL DS1 (7 - 20 DS1) | N | Y |
| GLOBRCL | GLOBAL RECENT CHANGE FOR LINES | N | Y |
| GX75RTU | EXTENDED X.75 PACKET GATEWAY | N | Y |
| ISAMBPM | ISDN AM BASED PROTOCOL MONITOR | N | Y |
| ISATRTU | ISDN ATTENDANT SERVICES | N | Y |
| ISBRIDS | ISDN BRI DATA SVCS PKG | N | Y |
| ISBSRTU | BRCS SUPP. SERVICES | N | Y |
| ISDNOAM | ISDN OA&M | N | Y |
| ISDN1 | INTEGRATED SERVICES DIGITAL NETWORK | N | Y |
| ISDN2 | INTEGRATED SERVICES DIGITAL NETWORK | N | Y |
| ISDOPRI | DATA ONLY PRI RTU | N | Y |
| ISESSPB | ISDN ESSENTIAL SERVICE PROTECTION BRI | N | Y |
| ISHGXRT | HUNT GROUP TRANSFER FOR CSD | N | Y |
| ISMBKDX | ISDN MULTIBUTTON KEY DELUXE | N | Y |
| ISMESRT | ISDN MESSAGE SERVICES | N | Y |
| ISPRIRT | ISDN PRIMARY INTERFACE SERVICES | N | Y |
| L2SMRTU | LASS II | Y | N |
| MCLDPFP | MODIFIED CALLING LINE DISCONNECT | N | Y |
| MUNITRT | ISDN MULTIPOINT DSL | N | Y |
| MUSHOLD | MUSIC ON HOLD | N | Y |
| MUTTRTU | MULTIPOINT DSL/BRI | N | Y |
| NIS1BSW | NATIONAL ISDN BASE | N | Y |
| NIS1CSD | NATIONAL ISDN DELUXE CSD-STND BRI | N | Y |
| NIS1DAT | NATIONAL ISDN BASIC DATA-STND BRI | N | Y |
| NIS1PSD | NATIONAL ISDN DELUXE PSD-STND BRI | N | Y |
| NIS1SBB | NATIONAL ISDN STND BRI BASE | N | Y |
| NIS2RTU | NATIONAL ISDN 2 | N | Y |
| PDD8TDM | 800 POST DIAL DELAY/TDM | Y | N |
| TDMACC | TDM ACC/INTERLATA SENT-PAID COIN | N | Y |
| TYPE2A2B | TYPE 2A/2B CELLULAR INT VIA SS7 | Y | N |
| UPNFAS | NAT'L ISDN2 UPGD DC BU TO NFAS | N | Y |
| USTDPRI | NAT'L ISDN2 UPGD CUST TO STAND | N | Y |

FIG. 2

| FEATURE PACKAGE CODE | FEATURE PACKAGE NAME | FEATURE PACKAGE ENABLED IN FIRST SWITCH? | FEATURE PACKAGE ENABLED IN SECOND SWITCH? |
|---|---|---|---|
| *MEMCALLEN | MEMORYCALL ENHANCED SERVICES | N | N |
| *PCLRIDML | CALLER ID - MULTI LINE | Y | Y |
| *PMEMCALL | MEMORYCALL SERVICE | N | N |
| ABLINK | A/B LINK & NO PATH ACCESS DELAY | N | N |
| ACDBI2 | ACD/BRCS INTERWORKING II | N | N |
| ACDCPND | ACD CLG PARTY # DELIVERY | N | N |
| ACDEPO | ENHANCED PROFESSIONAL OFFICE | N | N |
| ACDE911 | ACD/BRCS INTERWORKING FOR E911 | N | N |
| ACDMNGC | ACD BRCS MANAGED CONVERSION | N | N |
| ACKTMR2 | ADSI ACK TIMER - OPTIONAL TIMER | N | N |
| ACSRTU | ISDN CSR | N | N |
| AIAMABN | AMA RECORDING FOR BLNA AIN CALL | N | N |
| AIANEXP | AIN ANNOUNCEMENT ID EXPANSION | N | N |
| AIASP1B | ASP - RLS. 1 - 1B | Y | Y |
| AIBNER | ASP ORIG BLNA TRIGGERS/EXT RING | Y | Y |
| AICALTR | ASP CALL INFORMATION DISPLAY RTU | N | N |
| AICRP | ASP CALL ROUTING PARAMETERS | N | N |
| AICSD | ASP INTERWORKING WITH CSD RTU | Y | Y |
| AIDNTPS | ASP DNT PRE-QUERY SCREENING | Y | Y |
| AIDRDT1 | ASP DEFAULT RTE 3/6/10 DIGIT TRIGGER | Y | Y |
| AIMRCNP | ASP-POST QUERY SELECTIVE NPA DELETION | Y | Y |
| AIMRCS | ASP MULTIPLE RATE CENTER SUPPORT | Y | Y |
| AIMRCSE | ASP MRC SUPPORT ENHANCEMENTS | Y | Y |
| AIOHDIW | ASP OHD TRIGGER INTERACTIONS | N | N |
| AIOHDPS | ASP OHD PRE-QUERY SCREENING | N | N |
| AIPOLHB | PROXY OPTION FOR OLHB POPULATION | N | N |
| AIPROXY | AIN ADV SVCS REMT ACC PROXY | N | N |
| AIPXYEN | ASI PROXY ENHANCEMENTS | N | N |
| AIREPDL | REPEAT DIAL W/ASP BLNA TRIGGER | Y | Y |
| AIRPRXY | AIN ADV SVC I/F PROXY | N | N |
| AISBNER | ASP SUBSCRIBED ORIG B/NA TRIGGER | N | N |
| AISTOR | AIN SEND TO OUTSIDE RESOURCE | N | N |
| AITOLLF | AIN TOLL FREE SERVICE PHASE 1&2 | Y | Y |
| AIWISDN | ASP INTERWORKING WITH ISDN VOICE RTU | Y | Y |
| AI2PIC | 2 PIC W/ASP INTERWORKING RTU | N | N |
| ALAKRTU | ISDN AUTOMATIC LINE ASSIGNMENT RTU | N | N |
| ALARTU | ISDN AUTOMATIC LINE ASSIGNMENT RTU | N | N |
| ALIC5RT | ANALOG LINE TO INT CXR (ALIC5) | N | N |
| ALTLSP | ALT LOCAL SERVICE PROVIDER | N | N |
| AMADNS1 | AMADNS PHASE 1 | N | N |
| AMATERT | AMA TRACE ENHANCEMENTS | N | N |
| AMUNXTL | ENHANCED UNIX TOOLS IN AM RTU | N | N |
| ANIPRDS | ANI OVER PRIVATE FACILITIES/DS1 | N | N |
| ANIPRIV | ANI OVER PRIVATE FACILITIES | N | N |

FIG. 3A

| FEATURE PACKAGE CODE | FEATURE PACKAGE NAME | FEATURE PACKAGE ENABLED IN FIRST SWITCH? | FEATURE PACKAGE ENABLED IN SECOND SWITCH? |
|---|---|---|---|
| ANN15A | 5ESS SWITCH 15A ANNOUNCEMENT FEATURE | N | N |
| ASPCORE | ASP BASE PLATFORM FOR AIN 0.1 | N | N |
| ASPDR | ASP DISTINCTIVE RINGING | N | N |
| ASPLNP | ASP PLATFORM FOR NUMBER PORTABILITY | N | N |
| ASPSRTU | ASP/PVN SVC. SW. PT. | Y | Y |
| ASPSSPE | LASS ASP-SSP ENHANCEMENTS PH1 | Y | Y |
| ASPTAT | ASP DEF RTE/TERMINATE ATTEMPT TRIGGER | Y | Y |
| ASPTATC | ASP TERMINATING ATTEMPT TRIGGERS | N | N |
| ATTSNA | AUTO TRK TEST SCHEULER NON AUTOPLEX | N | N |
| AUCREXS | AUTOMATIC CALCULATION OF REX SCH | Y | Y |
| BAINDD | IDDD VIA ROUTING SFG | N | N |
| BASFGD | FGD CIC EXPANSION | Y | Y |
| BCVECRT | OSPS - BASIC CALL VECTORING | N | N |
| BICLAMA | COIN LINE AMA | N | N |
| BNAILRT | BASIC NAILUP | N | N |
| BNAILSL | BASIC NAIL-UP/SLICE | N | N |
| BNASED | ASP BUSY/NO ANSWER SUB. EVENT | N | N |
| BOSUSRT | AMA BILLING OPTION FOR SUSTWCR | N | N |
| BRCACTT | ATTENDANT CALL THROUGH TESTS ON TIE TRKS | Y | Y |
| BRCCFDA | CALL FWD DON'T ANSWER AFTER CALL WAITING | Y | Y |
| BRCCFLN | CALL FORWARDING CW LINE | N | N |
| BRCECTX | BRCS EXTENDED CENTREX | Y | Y |
| BRCETS | BRCS ETS (PER LINE) | N | N |
| BRCILMB | CALL FWD INHIBIT LINE BUSY AND MAKE BUSY | N | N |
| BRCPARK | CALL PARK PACKAGE TRU | N | N |
| BRCSAP | BRCS AP (PER LINE) | N | N |
| BRCSCTX | BRCS CENTREX | Y | Y |
| BRCSOHD | ASP BRCS/OHD INTERWORKING | Y | Y |
| BRCS1 | BRCS I | Y | Y |
| BRCS2SM | BRCS II | Y | Y |
| BRCS3LN | BRCS III | Y | Y |
| BRCS3SM | BRCS III | N | N |
| BRCS4LN | BRCS IV | N | N |
| BRCS4SM | BRCS IV | N | N |
| BRCUNIV | UNIVERSAL BRCS | Y | Y |
| BRC1CLN | BRCS I CUSTOMIZATION | Y | Y |
| BRDISRG | MULT DNS DISTINCT RING/ENHANCE RTU | N | N |
| BRSM | RSM (BASIC) | N | N |
| BRS3WCL | SPON USAGE SENSITIVE 3-W CL PKG | N | N |
| CALLSSV | CALLING LINE SIDE SUPERVISION | Y | Y |
| CASRTU | CAS/RELEASE LINK TRUNKS | N | N |
| CCAMRTU | CCS AM REAL TIME RELIEF | Y | Y |
| CCAMSL | CCS AM REAL TIME RELIEF (DLN)/SL | N | N |
| CCE30SL | CCS7 CAPAC ENHANCEMENTS (DLN30) | N | N |
| CCE30SM | CCS7 CAPAC ENHANCEMENTS (DLN30) | N | N |

FIG. 3B

| FEATURE PACKAGE CODE (312) | FEATURE PACKAGE NAME (314) | FEATURE PACKAGE ENABLED IN FIRST SWITCH? (316) | FEATURE PACKAGE ENABLED IN SECOND SWITCH? (318) |
|---|---|---|---|
| CCS7RTU | CCS7 TRUNK SIGNALING | Y | Y |
| CCS7SL | CCS7 RTU PER SLICE | Y | Y |
| CFDAPFR | CALL FWD DON'T ANSWER PRIV FACILITIES | N | N |
| CFDIRTU | DISTINCTIVE CALL FORWARDING PKG | N | N |
| CFPFLN | CALL FWD OVER PRIV FAC/LN | N | N |
| CFPFRTU | CALL FWD OVER PRIV FAC/SM | Y | Y |
| CFPFSL | CALL FORWARD OVER PRIVATE FACILITY/SLICE | Y | Y |
| CFTRTU | CALL FORWARDING ON TRUNKS | N | N |
| CIPRTU | CARRIER ID PARAMETER (CIP) | Y | Y |
| CLAS4RT | CLASS 4X OFFICE (ISP)/SM | N | N |
| CLAS4SL | CLASS 4X OFFICE (ISP)/SLICE | N | N |
| CLPKLN | CALL PARK/LINE | N | N |
| CLPKRTU | CALL PARK | Y | Y |
| CMDRSTR | COMMAND RESTRICTION FEATURE | Y | Y |
| CP-2354 | CALL WAITING DELUXE | N | N |
| CRSPFAL | CRAFT TO SET %AMA FULL ALARM LVLS | N | N |
| CSCANS | CSCANS IMPROVEMENT I | Y | Y |
| CSTPRT | CIRCUIT SWITCH TRUNK ENH | N | N |
| CSTSVC | CIRCUIT SWITCHED TRUNK SERVICE | N | N |
| CTXNETI | CENTREX NETWORK | N | N |
| CTXNETS | CENTREX NETWORK - SECURED RTU | N | N |
| CWDRTU | CALL WAITING DELUXE PHASE 1 | Y | Y |
| C7CPNKR | CPN/BN TO TERMINATING USER/SM2K | N | N |
| C7CPNRT | CPN/BN TO TERMINATING | N | N |
| C7INWKG | CCS7 INTERNETWORK LOCAL PKG | N | N |
| C7RELEN | CCS7 RELIABILITY ENHANCEMENT PKG | N | N |
| C7RELF1 | CCS7 RELIABILITY FCC LIST 1 PKG | N | N |
| DCFXRTU | DCLU/IDCU TR008 MODEL DC FX PI | N | N |
| DCPLCMI | DECOUPLING OF AM/CM FOR CM ONLY INITL | N | N |
| DICFC | DENY INTERNATIONAL CALLS FOR CTX | N | N |
| DNUS303 | TR303 ON DNU-S RTU | N | N |
| DUALPC | DUAL POINT CODES | N | N |
| EAOSSRT | EAOSS FOR OPERATOR SVCS CALL | N | N |
| EHDNRTU | MULTIPLE DN'S W/DIST. RING. ENHANCEMENT | N | N |
| EHDNSL | MULTIPLE DNS W/DISTINCT RING ENHANCEMENT | N | N |
| EINTMLT | ENHANCED INTERFACE TO MLT | N | N |
| EITARTU | ENHANCED INWATS BILLING ARRANGEMENT | Y | Y |
| ELINKRT | E-LINK ACCESS & ALTERNATE A-LINK | N | N |
| EPICRTU | ENH PROMPT-INBOUND CALL | N | N |
| EPOKECF | ENHANCED POKE CONFIRMATION | N | N |
| ETECTRT | END TO END CALL TRACE/SM | N | N |
| ETECTSL | ENE-TO-END CALL TRACE / SLICE | N | N |
| EXMRTU | EXM-2000 | N | N |
| EXMSART | EXM-2000 STANDALONE CALL PROCESS | N | N |
| E911 | ENHANCED E911 | N | N |

FIG. 3C

| FEATURE PACKAGE CODE | FEATURE PACKAGE NAME | FEATURE PACKAGE ENABLED IN FIRST SWITCH? | FEATURE PACKAGE ENABLED IN SECOND SWITCH? |
|---|---|---|---|
| FACR | FACR | N | N |
| FACRPLS | FACR+ | N | N |
| FANIRTU | FLEXIBLE ANI INFO DIGITS ASSIGNMENT | Y | Y |
| FARACCE | FAR ACCESS REMOTE | N | N |
| FIFIDDD | 15 DIGIT INTERNATIONAL DIRECT DIAL | Y | Y |
| FLEXANI | FLEXIBLE ANI PACKAGE RTU | N | N |
| FPCRRTU | FULL POINT CODE RTG FRO CCS7 END PT | N | N |
| FRACT1 | FRACTIONAL DS1 PER T1 | N | N |
| GX75KRT | X75' GATEWAY ACCESS/SM2K | N | N |
| HILNRTU | HOME INTERCOM/SINGLE LINE VARIETY PKG. | N | N |
| HINTCLN | HOME-INTERCOM (PER LINE) | N | N |
| HINTCSL | HOME INTERCOM (HI)/SLICE | N | N |
| HIRTU | HOME INTERCOM | N | N |
| HISLRTU | HOME INTERCOM/SLVP/SLICE | N | N |
| HISMRTU | HOME INTERCOM/SINGLE LINE VARIETY PKG. | N | N |
| HIUPLN | HOME INTERCOM UPDATE TO HI/SLVP (LN) | N | N |
| HIUPRTU | HOME INTERCOM UPDATE TO HI/SLVP | N | N |
| HIUPSL | HOME INTECOM UPDT-HI/SLVP/SL | N | N |
| IALTRUT | INTRASWITCH ANALOG LINE TRANSFER | N | N |
| IBDSPK1 | INTERNALLY BRIDGE DUAL SVC PKG1 | N | N |
| IBDSPK2 | INTERNALLY BRIDGE DUAL SVC PKG2 | N | N |
| ICLIDMG | ICLID ENHANCEMENT FOR MLHG | N | N |
| ICLID4W | ICLID ON 4-WIRE SUBSCRIBER LINE ON DNU-S | N | N |
| ICPNBLG | CALLING PARTY NUMBER ON PRI | N | N |
| IMFOSSL | INTERFACE TO MFOS/SLICE | N | N |
| IMPRSLT | IMPROVED SLT PROCEDURES | Y | Y |
| IMSGLOO | ISUP MESSAGE LOOP DETECTION | Y | Y |
| IMSTANN | ACD-IMMEDIATE START ANNC INTERFACE | N | N |
| INFMFOS | INTERFACE TO MFOS/SM | N | N |
| INPARTU | INTERCHANGEABLE NPA | Y | Y |
| INSSENH | INTERSWITCH SIGNALING ENHANCEMENT PKG | Y | Y |
| INTRAPC | INTRALATA PIC | Y | Y |
| IPCDACB | DENY AC ON INTRALATA PIC CALLS | N | N |
| IPGAP | ASP LASS INTELLIGENT PERIPHERAL | N | N |
| IROP144 | INCREASE COLLECT UNITS F/ROP-144 | N | N |
| ISAPLDV | AP LINK DIVERSIFICATION | N | N |
| ISATGOW | ISDN ATTNDT GRP OVERLOAD WARNING | N | N |
| ISATOLS | ISDN ATTENDATN OFFERED LOAD STATUS | N | N |
| ISATRBV | ISDN ATTNDT RMT BUSY VERIFY | N | N |
| ISBRIN | NATIONAL ISDN BRI PACKAGE RTU | N | N |
| ISCPPRI | CPN/BN TRANSMITTAL-5E PRIV NTWK/PRI | N | N |
| ISCTBRT | CPN/BN TO TERMINATING | N | N |
| ISCTPRT | CPN/BN TO TERM. PRI USER | N | N |
| ISCXPPI | CENTREX PRI ENHANCEMENT/PRI | N | N |
| ISCXPRI | CENTREX PRI ENHANCEMENTS | N | N |

FIG. 3D

| FEATURE PACKAGE CODE | FEATURE PACKAGE NAME | FEATURE PACKAGE ENABLED IN FIRST SWITCH? | FEATURE PACKAGE ENABLED IN SECOND SWITCH? |
|---|---|---|---|
| ISDATAS | ISDN DATA RTU FOR SM | N | N |
| ISDATA2 | ISDN DATA RTU FOR SM2K | N | N |
| ISDATTD | ISDN ATTENDANT SERVICES RTU | N | N |
| ISDBSAX | ISDN DGTL BUSINESS SYS AUTO EXCLUSION | N | N |
| ISDCAL | DIRECT CONNECT THRU ISDN ACVT AN | N | N |
| ISDNKOA | ISDN OA&M PACKAGE/SM2K | N | N |
| ISDN2K | GATEWAY NETWORKING PKG/SM2K | N | N |
| ISDQUES | QUEUING PACKAGE RTU FOR SM | N | N |
| ISDQUE2 | QUEUING PACKAGE RTU FOR SM2K | N | N |
| ISDTRTU | DUAL TELEPHONE COVERAGE | N | N |
| ISEIPRI | ETN INTERWORKING/5E PRIVATE NETWORK | N | N |
| ISELMED | ISDN ELECTRONIC DIR SVCS/MEDS | N | N |
| ISELRTU | ISDN ATTENDANT DIRECTORY | N | N |
| ISEPRTU | ETN ON PRI TRK. | N | N |
| ISERCRT | ISDN EXECUTIVE RINGER CUTOFF | N | N |
| ISEX25 | ENHANCE X25 PKT SW-TRUSTED DATA TERM EQ | N | N |
| ISHGXKR | HUNT GROUP XFER FOR CKT SW DATA SM2K | N | N |
| ISICRTU | PRI ACCESS TO SEL. IC'S | N | N |
| ISIGKRT | X75 GATEWAY-PUBLIC DATA NTWK | N | N |
| ISIGRTU | X75 PACKET GATEWAY ACCESS | N | N |
| ISISDNG | ISDN INCREASED SHARED DN GROUP SIZE | N | N |
| ISLPRI2 | LOADED PRI PKG 2 (NATL & CUSTOM) RT | N | N |
| ISMBKPK | MBKS PACKAGE RTU | N | N |
| ISMBKRT | ISDN MULTIBUTTON KEY BASIC | N | N |
| ISMBKUP | UPDATE FROM ISDN MBKS BASIC | N | N |
| ISMETHU | ISDN METRO HUB/SW | N | N |
| ISMHPRI | ISDN METRO HUB/PRI | N | N |
| ISMSSMS | ISDN MESSAGE SERVICES | N | N |
| ISMULTI | ISDN MULTIPOINT RTU | N | N |
| ISPROMN | ISDN PROTOCOL MONITOR PACKAGE RTU | N | N |
| ISQCSKR | QUEUING FOR CKT SWITCH DATA MLHG | N | N |
| ISQCSRT | QUEUING CKT. SW. DATA MLHG | N | N |
| ISRMTPA | REMOTE PROTOCOL ACCESS | N | N |
| ISSCQKR | QUEUE MONITOR/MLHG QUEUING/SM2K | N | N |
| ISSCQRT | SUPERVISOR CONSOLE - MLHG QUEUING | N | N |
| ISSDNEC | ISDN SHARED DN ENH-CONFERENCE CL | N | N |
| ISTFRTU | DSU2-ISTF CAPABILITY | Y | Y |
| ISVLBRT | LINE BLOCKING ENH FOR ISVM RTU | N | N |
| ISVMRTU | INTERSWITCH VOICE MESSAGING SERVICES | N | N |
| ISX25PR | X25 PACKET SWITCHING ON T1 | N | N |
| IWSMDR | ASP INTERWORKING WITH SMDR | N | N |
| IXETAN | IXE TANDEM CALLS VIA 2 LOCAL A | N | N |
| LAACCOT | LASS AC/2 LEVEL ACTIVATION | Y | Y |
| LAANCNA | LASS CALLING NAME DELIVERY | Y | Y |
| LAARAC | LASS AR/AC DUAL TIMER QUEUING ACTIVATION | Y | Y |

FIG. 3E

| FEATURE PACKAGE CODE | FEATURE PACKAGE NAME | FEATURE PACKAGE ENABLED IN FIRST SWITCH? | FEATURE PACKAGE ENABLED IN SECOND SWITCH? |
|---|---|---|---|
| LABCLID | LASS BULK CALLING LINE ID | N | N |
| LACBLPN | AC BLOCKED TO PRIVATE NUMBER RTU | N | N |
| LACBPN | AUTO CALLBACK BLOCKED TO PVT NO. | Y | Y |
| LAFPISO | FORCED PRIVACY/INTERSW OUT CALL RTU | N | N |
| LALARTU | ALT LANGUAGE LASS ANNOUNCEMENT | N | N |
| LALNRTU | LASS (TOUCHSTAR) | Y | Y |
| LARACDT | LASS AR/AC DUAL TIMER ACTIVATION RTU | N | N |
| LARACPN | LASS AR/AC W/PRIVATE # ID-AMA RTU | N | N |
| LARLRTU | LASS I-AUTOMATIC RECALL (LN) | N | N |
| LARSLRT | LASS AUTOMATIC RECALL/SLICE | N | N |
| LARSRTU | LASS I-AUTOMATIC RECALL (SM) | N | N |
| LASLRTU | LASS 1 PACKAGE PER SLICE | Y | Y |
| LASMRTU | LASS (TOUCHSTAR) | Y | Y |
| LBASEPK | LASS BASE PACKAGE RTU | N | N |
| LBCLLID | BULK CALLING LINE ID RTU | N | N |
| LCBLRTU | LASS I-AUTOMATIC CALLBACK (LN) | N | N |
| LCBSLRT | LASS AUTOMATIC CALLBACK/SLICE | N | N |
| LCBSRTU | LASS I-AUTOMATIC CALLBACK (SM) | N | N |
| LCIDDCW | CALLER ID WITH CALL WAITING | Y | Y |
| LDCWRTU | LONG DISTANCE CW/DIST TONE/RING | N | N |
| LFPRIV | FORCED PRIVACY ON INTRASWITCH OUTG | N | N |
| LFSKRTU | SWITCH-TO-CPE ANALOG FSK DATA INTERFACE | Y | Y |
| LICLID | ICLID ENHANCEMENTS FOR MLHG/LN RTU | N | N |
| LICLRTU | LASS I-ICLID (LN) | N | N |
| LICSLRT | LASS INDIVIDUAL CALL LINE ID/SL | N | N |
| LICSRTU | LASS I-ICLID (SM) | N | N |
| LINTSBR | LINE TIME SLOT BRIDGING (SWITCH MOD) | N | N |
| LINTSBS | LINE TIME SLOT BRIDGING (SWITCH) | N | N |
| LNAANCN | ANALOG CALLING NAME DELIVERY/LINE | N | N |
| LNCIDCW | CALLING ID DELIVERY ON CW/LINE | N | N |
| LNCWDRT | CALL WAITING DELUXE/LINE - PHASE I | N | N |
| LNFSKRT | SW-CPE ANALOG OH FSK/LINE | N | N |
| LNPAAB1 | NUMBER PORTABILITY - AMA ACCESS BILLING | Y | Y |
| LNPAMA1 | BASIC LRN AMA RTU | N | N |
| LNPAPND | APND BAF MOD 164 W/CHGBL AN CAN REC | N | N |
| LNPBASP | NP - BASIC REQUIRED LRN PACKAGE RTU | N | N |
| LNPBAS1 | BASIC LRN/LOCAL NO. PORTABILITY | Y | Y |
| LNPDEL1 | DELUXE LRN/LOCAL NO. PORTABILITY | Y | Y |
| LNPERSP | NUMBER PORTABILITY-OFFICE WIDE RES | N | N |
| LNPLRTQ | LNP TEST QUERY FOR LRNS | Y | Y |
| LNPNCD1 | LNP NONCONDITIONAL 10-DIGIT TRIG FOR DID | Y | Y |
| LNPNCT1 | LNP-NON-CONDITIONAL 10-DIGIT TRIGGER | Y | Y |
| LNPNXGP | NP -10 DIG OFC NPA-NXX GROW PKG RTU | N | N |
| LNPNXG1 | LNP-NPA/NXX GROWTH TO 8000 | N | N |
| LNPNXG2 | FEATURE INTERACTION FOR 10 DIGIT OFFICE | N | N |

FIG. 3F

| FEATURE PACKAGE CODE | FEATURE PACKAGE NAME | FEATURE PACKAGE ENABLED IN FIRST SWITCH? | FEATURE PACKAGE ENABLED IN SECOND SWITCH? |
|---|---|---|---|
| LNPSPA3 | NP-SVC PROVIDER AMA ENHANCE 2 RTU | N | N |
| LNPVOC | NP-VERIFY OFFICE FOR LNP RTU | N | N |
| LOTLRTU | LASS I-CUST ORIGINATED TRACE (LN) | N | N |
| LOTSLRT | LASS CUSTOMER ORIGINATED TRACE/SLICE | N | N |
| LOTSRTU | LASS I-CUST ORIGINATED TRACE (SM) | Y | Y |
| LRCAMA | RETURN CALL AMA | N | N |
| LSCALRT | LASS II-SELECTIVE CALL ACCEPTANCE (LN) | N | N |
| LSCARTU | LASS II-SELECTIVE CALL ACCEPTANCE (SM) | N | N |
| LSCASLR | LASS SELECTIVE CALL ACC/SLICE | N | N |
| LSCFLRT | LASS II-SELECTIVE CALL FORWARD (LN) | N | N |
| LSCFRTU | LASS II-SELECTIVE CALL FORWARDING (SM) | N | N |
| LSCFSLR | LASS SELCETIVE CALL FORWARD/SLICE | N | N |
| LSCPNPC | LASS CLG PARTY # PRESENTATION | N | N |
| LSCRLRT | LASS II-SELECTIVE CALL REJECTION (LN) | N | N |
| LSCRRTU | LASS II-SELECTIVE CALL REJECTION (SM) | N | N |
| LSCRSLR | LASS SELECTIVE CALL REJ/SLICE | N | N |
| LSDALRT | LASS II-SELECTIVE DIST ALERT (LN) | N | N |
| LSDARTU | LASS II-SELECTIVE DIST ALERT (SM) | N | N |
| LSDASLR | LASS SELECTIVE DISTINCTIVE ALERT/SLICE | N | N |
| LSPOLIN | LASS PVT OPTION/LAST INCOMING # | N | N |
| LSRICOT | LASS REMOVE ISDN COT AGENCY | N | N |
| LSUCRTU | UNIDENTIFIED CALLER REJECTION | Y | Y |
| LTRKBLG | LOCAL TRUNK BILLING ENHANCEMENT | N | N |
| LVSNPAS | LASS VALIDATION & SCREENING NPA | N | N |
| L2LNRTU | LASS II | Y | Y |
| L2SLRTU | LASS 2 PACKAGE PER SLICE | Y | Y |
| MCLDERT | MODIFIED CALLING LINE DISC ENH | N | N |
| MDLNEPL | MULTIPLE DNS W/DIST RING ENH (LN) | Y | Y |
| MPRTU | MULTIPOINT ON CUSTOM FOR FACR RTU | N | N |
| MSGPKG1 | MSG PACKAGE 1 RTU | N | N |
| MSSFCCS | FORWARDED CALL SCREENING | N | N |
| MTPNODR | MTP NODE RESTART | Y | Y |
| MUDNLN | RINGMASTER (MULT DNS W/DIST - LN) | N | N |
| MUDNRTU | RINGMASTER | Y | Y |
| MUDNSL | MULTIPLE DNS W/DISTINCTIVE RINGING/SLICE | N | N |
| MUIPKRT | MULTIPLE IP TRUNK GROUPS/SM2K | N | N |
| MUIPRTU | MULTIPLE IP TRUNKS | N | N |
| MUSHOLN | MUSIC ON HOLD/LINE | N | N |
| NESS | ASP-NETWORK ELEMENT SVCS SIGNALING | N | N |
| NFAS3T6 | NATL ISDN2 ADDL DS1 CH 3 - 6 | N | N |
| NFA7T20 | NATL ISDN2 ADDL DS1 CH 7 - 20 | N | N |
| NIAVAIL | PRI B-CHAN AVAILABILITY SIGNALING RTU | Y | Y |
| NIPROVS | NISDN PROVISIONING SIMPLIFICATION RTU | N | N |
| NIREDNO | REDIRECTING NO. DELIVERY ON PRI | Y | Y |
| NIREDOR | REDIRECT NUMBER ORIG ON PRI RTU | N | N |

FIG. 3G

| FEATURE PACKAGE CODE | FEATURE PACKAGE NAME | FEATURE PACKAGE ENABLED IN FIRST SWITCH? | FEATURE PACKAGE ENABLED IN SECOND SWITCH? |
|---|---|---|---|
| NISBPRI | BASIC NATIONAL PRI W/NFAS & DCBU | N | N |
| NISDNPM | NISDN PROTOCOL MONITOR TRANSLATOR | N | N |
| NISLPRI | LOADED NATIONAL PRI | N | N |
| NISNFAS | 2ND DS1/D-CH W/NFAS & DCBU | N | N |
| NISPK | AUTO SVC PROFILE ID/SM2K | N | N |
| NISPSM | AUTO SVC PROFILE ID/SM | N | N |
| NISSPRI | NATIONAL ISDN STANDARD PRIMARY RATE | N | N |
| NIS10LN | NISDN 5E10 BRI PACKAGE/LINE | N | N |
| NI11BLN | NISDN 5E11 BRI PKG/LINE | N | N |
| NI11BSW | NISDN 5E11 BRI PKG/SWITCH | N | N |
| NI11PSW | NISDN 5E11 PRI PKG/SWITCH | Y | Y |
| NI5E10 | NISDN 5E10 BRI PACKAGE | N | N |
| NPA888 | TOLL-FREE FOR NPA 888 PHASE 1 | N | N |
| OAMPKG1 | OAM PACKAGE 1 RTU | N | N |
| OAMPKG2 | OAM PACKAGE 2 RTU | N | N |
| OAMPKG3 | OAM PACKAGE 3 RTU | N | N |
| OBROLVI | OPERATOR LINE VERIFY W/CLFWD BL | N | N |
| ORMRTU | ORM-OPTICALLY REMOTE SW MOD BASIC | N | N |
| ORMSART | ORM/SM STANDALONE | N | N |
| OSCBSCP | CARD BASED SPEED DIAL - CALL PROC. | N | N |
| OUTVPAT | OPTIONAL 7/10 DIGIT OUTPULSING | N | N |
| PDD8EO | 800 POST DIAL DELAY/END OFC | Y | Y |
| PPCOMP | PAY PHONE COMPENSATION | Y | Y |
| PREXBI | PROHIBIT REX ON BRI DATA(INDV LINE) | N | N |
| PREXBO | PROHIBIT REX ON BRI DATA (OFFICE) | N | N |
| PRIDCNL | PRI D-CHANNEL CAP EXPANSION FOR SM | Y | Y |
| PSAPSUP | ISDN PSAP SUPPORT | N | N |
| PSCIRMN | CALL/CIRCUIT MONITOR SS7-PSU RTU | Y | Y |
| PSUEXM2 | SS7-PSU ON SM/EXM-2000 RTU | N | N |
| PUP11 | PLATFORM UPGRADE PKG: 5E10-5E11 | N | N |
| RACFRTU | REMOTE ACTIVATION OF CALL FORWARDING | Y | Y |
| RACFSL | REMOTE ACTIVATION OF CALL FWD/SLICE | N | N |
| RCOS10 | RCOS APTEXT FOR 5E10 | N | N |
| REVPUL | REVERTIVE PULSING | N | N |
| RMACFPL | RMT ACTIVATION OF CALL FORWARD (LN) | N | N |
| RPAPRI | REMOTE PROTOCOL MONITORING FTR. | N | N |
| RSDPFLN | RSD ASM BASE 5E12 PKG/LN RTU | N | N |
| RSDSULN | RSD SOFTWARE UPDATE PKG/LN RTU | N | N |
| RTALARM | REORDER THRESHOLD ALARM | N | N |
| RTAMLL | ROUTE OUTAGE AML RTU | N | N |
| RTU800 | 800 NUMBER SERVICES | Y | Y |
| RVPLSL | REVERTIVE PULSING/SLICE | N | N |
| SACPLRT | SAC CALL TYPE/CODES IN CONFLICT/I | N | N |
| SACRTU | SAC CALL TYPES FOR CODES IN CONF | N | N |
| SBPUMP | SELECTIVE BROADCAST PUMP RTU | N | N |

FIG. 3H

| FEATURE PACKAGE CODE | FEATURE PACKAGE NAME | FEATURE PACKAGE ENABLED IN FIRST SWITCH? | FEATURE PACKAGE ENABLED IN SECOND SWITCH? |
|---|---|---|---|
| SCCSSRV | SCCS SURVEILLANCE OS SYSTEM | N | N |
| SCDRTU | SELECTIVE CXR DENIAL/SM | N | N |
| SCDSL | SELECTIVE CARRIER DENIAL/SLICE | N | N |
| SCIA | SIMPLIFIED CUSTOM ATTENDANT RTU | N | N |
| SDASSFG | DIGIT ANALYSIS SELCTION ON SFG | Y | Y |
| SFTYNET | SAFETY NET FOR CNI RING RECOVERY | N | N |
| SLS8BIT | SLS EXPANSION TO 8 BITS | N | N |
| SRCOUTP | SELECTIVE MANUAL RC OUTPUT RTU | N | N |
| SRSM | RSM STAND-ALONE CAPABILITY/BILLING | N | N |
| SSNCAP | SUBSYSTEM # CAPACITY INCREASE | Y | Y |
| SSPRTU | SERVICE SWITCHING POINT | Y | Y |
| SUBSAC4 | 4-WIRE SUBSCRIBER ACCESS | N | N |
| SUPAUTO | SOFTWARE UPD PROCESS AUTO | N | N |
| SUPRING | SUPPRESSED RINGING-BTP | N | N |
| SUSTWCR | SPONTANEOUS USAGE SENSITIVE 3 WAY CALL | N | N |
| SVMUDN | SWITCH VERIFICATION OF MULTIPLE DNS | N | N |
| TALKCW | TALKING CALL WAITING | N | N |
| TCAP | TCAP MSG TANDEM FOR LASS/ISM | N | N |
| TCAPML | TCAP IMPRV FOR SW SPANNING MULT LATA | N | N |
| TEST108 | TEST LINE CAPACITY ENHANCEMENT | Y | Y |
| TFNPA888 | TOLL-FREE FOR NPA 888 PHASE 1 | N | N |
| TF866 | 866-822 TOLL FREE SERVICE | Y | Y |
| TGSRISU | TERM. GRP STATION RESTRICT ISUP | N | N |
| TG4000 | INCREASE TRUNK GROUPS TO 4000 RTU | N | N |
| TKGRPLA | TRUNK GROUP LIST AUDIT | Y | Y |
| TPCCENH | THIRD PARTY CALL CONTROL | N | N |
| TRACPRT | TRANSACTION CAPABILITIES | Y | Y |
| TSMS | TELEPHONE STATUS MONITOR & SEL RTU | N | N |
| TYP1AMA | TYPE 1 CELL WIRELESS AMA RECORDING RT | N | N |
| UPBRCS1 | BRCS UNIVERSAL UPGRADE FROM BRCS1-SM | Y | Y |
| UPB1UNV | BRCS UNIVERSAL UPGRADE FROM BRCS1-LN | N | N |
| UPCTXLN | BRCS CTX UPDATE FROM BRCS2 (PER LN) | Y | Y |
| UPCTXSM | BRCS CTX UPDATE FROM BRCS2 (PER SM) | Y | Y |
| UPDLN30 | UPGRADE FROM DLN TO DLN30 | N | N |
| USTWCRT | SPONTANEOUS USAGE SENSITIVE 3 WAY CALL | Y | Y |
| USUSTWC | UPGRADE TO SPON USAGE SENSITIVE 3 WAY | N | N |
| VECTBUY | ACD VECTORING PACKAGE BUYOUT | N | N |
| VECTSML | ACD VECTORING PKG SMALL CUSTOMER | N | N |
| VPROMEN | VECTOR PROMPT ENHANCEMENT | N | N |
| 5E-1291 | INTRALATA PIC | Y | Y |

FIG. 3I

| FEATURE PACKAGE CODE | FEATURE PACKAGE NAME | FEATURE PACKAGE ENABLED IN FIRST SWITCH? | FEATURE PACKAGE ENABLED IN SECOND SWITCH? |
|---|---|---|---|
| AIARASC | ASP AMA REC ABAND STOR CONNECTS | N | |
| AIMDCLE | ASP MID-CALL EVENTS | N | |
| AINBNEL | ASP NETWORK BUSY EVENT RTU | N | |
| AINETBUSY | ASP NETWORK BUSY EVENT RTU | N | |
| AITBNAT | ASP TERM BUS/NA TRIG. SUB EVENT | N | |
| AITIFAP | ASP TOLL FREE INTERACT W/FLEX ANI | N | |
| ASPDNTC | ASP DIALING PLAN TRIGGERS | N | |
| ASPORTG | ASP SUBSCRIBED ORIGINATING TRIGGERS | N | |
| ASPSTOR | GLOBAL RECENT CHANGE INTERACTION | N | |
| ASTOR | ASP STOR INTERWRKG W/ORIG BLNA W/EX | N | |
| BAS14CR | 5E14 OPERATING SYSTEM | N | |
| BAS14RT | 5E14 BASE APPLICATIONS | Y | |
| CALEACR | CALEA CORE | N | |
| DWD4EL | DELETE WARNING DISPLAY FOR ESL LINES | N | |
| GETSHPC | GETS HIGH PROBABILITY OF COMPLETION | N | |
| IBDSPK3 | INTERNALLY BRIDGE DUAL SVC PKG3 | N | |
| LNPDPBX | DID PBX QUERY ENHANCEMENT | N | |
| LNPNPLG | NUMBER POOLING USING NUMBER PORTABILITY | N | |
| LNPPTE1 | PERSISTENT TRANSACTIONS ENHANC RTU | N | |
| LNPSPAP | NP - SP PORT AMA BILL ENHANCE PKG RTU | N | |
| LNPSPPA | SVC PROVIDER PORTABILITY AMA | N | |
| MRCVFYF | IMPROVED RC VERIFY | N | |
| MTRF60 | 60 MINUTE TRAFFIC REPORTING OPTION | N | |
| NICAUSE | BELLCORE CAUSE CODES & LOCATION VALUE | N | |
| NICLPK | NATIONAL ISDN CALL PARK RTU | N | |
| OABILL | OA/DA BILLING FOR UNBUNDLED LOCAL SW | N | |
| OSCNAM | ORIGINATING SWITCH CALLING NAME | N | |
| PBXCGID | PBX CALLING ID | N | |
| PSUCIRMN | CALL/CIRCUIT MONITOR SS7-PSU RTU | N | |
| PUP14 | 5E14 BASE UPDATE RTU | N | |
| RCVYABD | RECOVERY FROM ALTERNATE BOOT DISK | N | |
| RSDDRCLN | RSD RECENT CHANGE PKG/LN RTU | N | |
| RSDRCLN | RSD RECENT CHANGE PKG/LN RTU | N | |
| RSDRFLN | RSD OSDE RETROFIT PKG/LN RTU | N | |
| RSMDNUS | RSM (CLASSIC) VIA DNU-S RTU | N | |
| STPTKRS | STOP TRUNK GROUP RESTORAL RTU | N | |
| TBCTNTC | TBCT NOTIFICATION TO CONTROLLER | N | |
| TPCCENU | 3PTY CALL CONTROL ENHANCEMENTS | N | |
| USTWCAC | ACCESS CODE FOR SUS 3-WAY CALL RTU | N | |
| VFDE | VOICE FREQUENCY DATA ENHANCE RTU | N | |
| 4.11NS1 | AMADNS PHASE 1 | | N |

FIG. 4

SYSTEMS AND METHODS TO COMPARE OPERATIONAL STATUSES OF SWITCH FEATURE PACKAGES

BACKGROUND OF THE INVENTION

1. Field of the Invention

Embodiments of the present invention relate to configuration of telecommunications switches. More particularly, embodiments of the present invention relate to systems and methods for comparing operational statuses of switch feature packages.

2. Background Information

Known telecommunications networks have switches that include software modules that support one or more features. For example, a switch can include software that supports features (e.g., feature packages) such as an Integrated Services Digital Network ("ISDN"), ISDN attendant services, modified calling line disconnect, ISDN multipoint Digital Subscriber Line ("DSL"), music on hold, national ISDN base, type 2A/2B cellular interface via Signaling System 7 ("SS7"), caller identification ("caller ID") multiline, call waiting deluxe, Centrex network, RingMaster™ distinctive ringing, pay phone compensation, 800 number services, service switching point, talking call waiting, and so on. A switch feature package may or may not be loaded on a switch (e.g., the switch may or may not have the capacity to loaded and/or execute the switch feature package). Even when a switch feature package is loaded, it may or may not be enabled based on service operation factors. For example, a feature package of a switch may not be enabled due to a present lack of demand for the service that corresponds to that feature package. After demand for that service exists (or is anticipated based on, for example, a marketing campaign), the feature package can be enabled.

When a new switch is installed to replace an old switch (e.g., a switch upgrade), the status of the feature packages (e.g., enabled, disabled, and so on) in the new switch and the old switch should be the same. When features that were enabled in the old switch are not enabled in the new switch, customers may no longer receive services corresponding to the non-enabled features. For example, a customer may no longer receive Caller ID information, be able to utilize Call Waiting, and so on. A known method for comparing the operational status (e.g., enabled, disabled) of feature packages of two switches is a manual, line by line, comparison. In view of the foregoing, a substantial need exists for systems and methods that can compare the operational statuses of switch feature packages.

BRIEF SUMMARY OF THE INVENTION

Embodiments of the present invention relates to systems and methods for comparing feature package operational statuses of two or more switches. In an embodiment, the system includes a first switch and a second switch. The first switch includes a first set of feature packages, and the second switch includes a second set of feature packages. The system also includes a computer coupled to the first switch and to the second switch. The computer is to receive a first set of feature package information and a second set of feature package information. The first set of feature package information corresponds to the first set of feature packages, and the second set of feature package information corresponds to the second set of feature packages. The computer is to compare the first set of feature package information and the second set of feature package information.

BRIEF DESCRIPTION OF THE DRAWINGS

FIG. 2 illustrates an embodiment of the present invention.

FIGS. 3A through 3I illustrate another embodiment of the present invention.

FIG. 4 illustrates another embodiment of the present invention.

DETAILED DESCRIPTION OF THE INVENTION

According to an embodiment of the present invention, a system can retrieve a first set of feature packages operational status information from a first switch and a second set of feature packages operational status information from a second switch. The system can compare the first set of feature packages operational status information and the second set of feature packages operational status information. In an embodiment, the comparison can yield an output that indicates feature packages that are loaded in both the first switch and the second switch but do not have the same operational status. For example, a feature package can be loaded in both the switches, but enabled (e.g., active) in one switch and disabled (e.g., inactive) in the other switch. In another embodiment, the comparison can yield an output that indicates loaded feature packages and the operational status of each loaded feature package in each switch.

Figure 1:
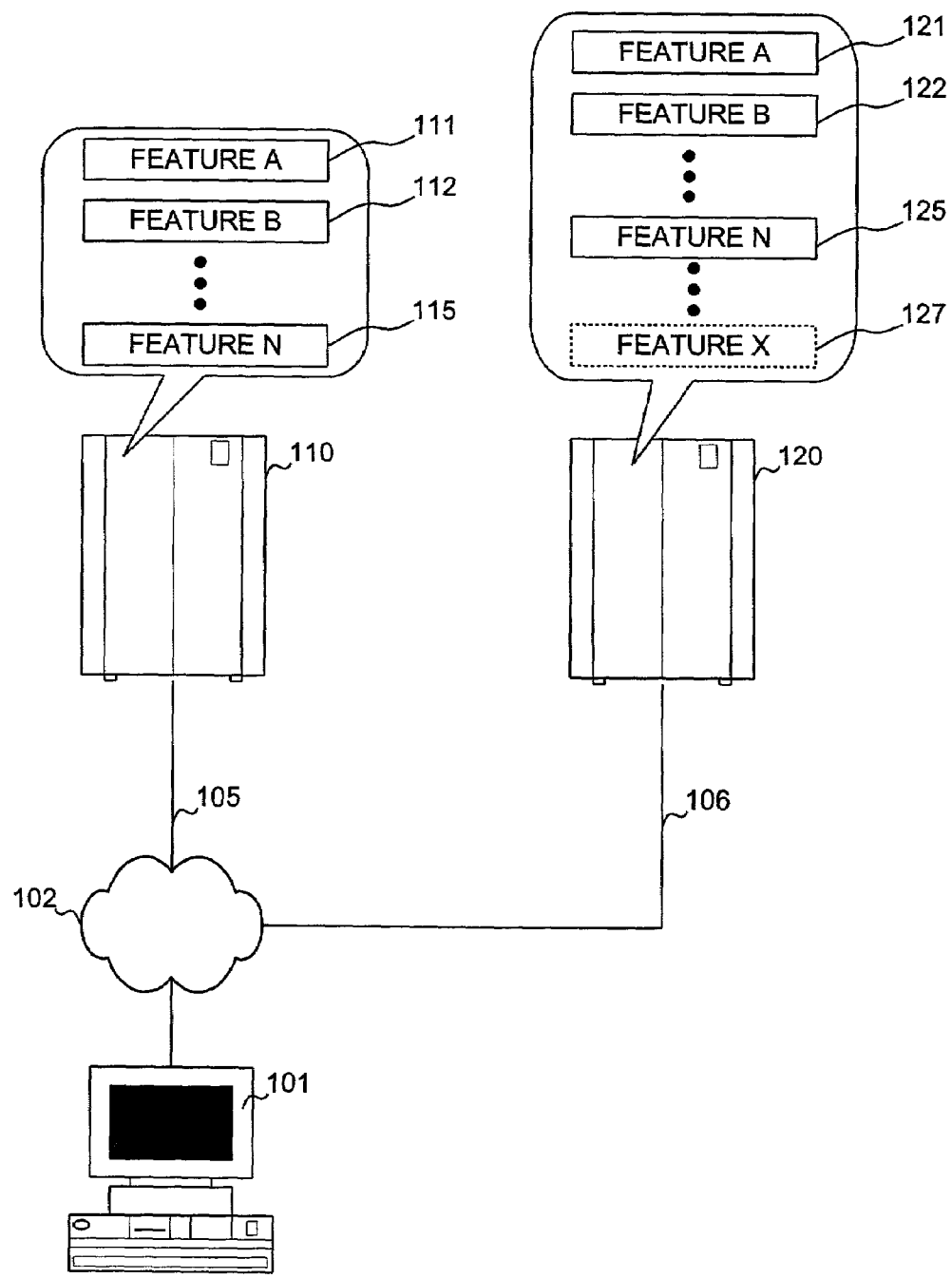
FIG. 1 is a schematic diagram showing an embodiment of the present invention.

FIG. 1 is a schematic diagram showing an embodiment of the present invention. A computer 101 is coupled to a first switch 110 via a communications link 105 and to a second switch 120 via a second communications link 106. As used to describe embodiments of the present invention, the term "coupled" encompasses a direct connection, an indirect connection, or a combination thereof. Moreover, two devices that are coupled can engage in direct communications, in indirect communications, or a combination thereof.

In an embodiment, computer 101 includes a processor and a memory. The processor can be, for example, an Intel Pentium® 4 processor, manufactured by Intel Corp. of Santa Clara, Calif. As another example, the processor can be an Application Specific Integrated Circuit (ASIC). The memory may be a random access memory (RAM), a dynamic RAM (DRAM), a static RAM (SRAM), a volatile memory, a non-volatile memory, a flash RAM, polymer ferroelectric RAM, Ovonics Unified Memory, magnetic RAM, a cache memory, a hard disk drive, a magnetic storage device, an optical storage device, a magneto-optical storage device, or a combination thereof. The memory of computer 101 can store a plurality of instructions adapted to be executed by the processor of computer 101. In an embodiment, computer 101 is coupled to switches 110 and 120 via network 102 and a network connection (e.g., data port, input/output port, etc.). Examples of network 102 include a Wide Area Network (WAN), a Local Area Network (LAN), the Internet, a wireless network, a wired network, a connection-oriented network, a packet network, an Internet Protocol (IP) network, at least a portion of the public switched telephone network ("PSTN"), or a combination thereof.

Each of switches 110 and 120 can include a plurality of feature packages. For example, first switch 110 can include feature package A 111, feature package B 112, . . . and feature package N 115. In an embodiment, second switch 120 can include a corresponding set of feature packages, such as a feature package A 121 corresponding to feature package A 111, a feature package B 122 corresponding to feature package B 112, . . . a feature package N 125 corresponding to feature package B 115. In another embodiment, second switch 120 can include additional feature packages, such as feature package X 127, that do not correspond to a feature package of first switch 110.

For example, first switch 110 can be a Lucent 5E3 switch (from Lucent Technologies Inc. of Murray Hill, N.J.) and second switch 120 can be another Lucent 5E3 switch, and each of feature package A 111 and feature package B 121 can be a National ISDN Base feature package. As another example, first switch 110 can be a Nortel DMS-500 switch (from Nortel Networks Limited of Montreal, Quebec, Canada) of a first central office and second switch 120 can be another Nortel DMS-500 switch of a second central office, and each of feature package N 115 and feature package N 125 can be a Caller ID with call waiting feature package. As a further example, the first switch and the second switch can be different types of switches (e.g., switches from different switch manufacturers) that include comparable sets of feature packages. In other embodiments of the present invention, first switch 110 can be a host switch and second switch 120 can be a remote switch of the host switch, or each of first switch 110 and second switch 120 can be remote switches (e.g., remotes of the same host, remotes of different hosts, etc.), or each of first switch 110 and second switch 120 can be host switches, and so on.

In an embodiment, computer 101 can include instructions (e.g., a software script) to query each of first switch 110 and second switch 120 for feature package operational status information. For example, computer 101 can receive a first set of feature package operational status information from first switch 110 via a first Telnet session and can receive a second set of feature package operational status information from second switch 120 via a second Telnet session. Computer 101 can then compare the first set of feature package operational status information to the second set of feature package operational status information to determine relative differences, similarities, and/or matches in the sets of feature package operational status information.

FIG. 2 illustrates an embodiment of the present invention. A data record 200 can include feature package operations status information that indicates differences in a first set of feature package operational status information from a first switch and a second set of feature package operational status information from a second switch. For example, data record 200 includes feature package operational status information for feature packages loaded in each of a first switch and a second switch where the operational status of corresponding feature packages is different, e.g., a feature package in one switch is enabled and a corresponding feature package in the other switch is not enabled.

Data record 200 can include a plurality of data entries such as data entry 210. Data entry 210 corresponds to a type of feature package loaded in each of the first switch and the second switch (e.g., an Automatic Message Accounting ("AMA") for Type 2 Cellular feature package). Data entry 210 can include a plurality of data fields, where each data field can store a data value. In an embodiment, data entry 210 can include a feature package code field 212 to store a feature package code, a feature package name field 214 to store a feature package name, a feature package enabled in first switch field 216 to store a feature package enabled in first switch field value (e.g., a boolean value), and a feature package enabled in second switch field 218 to store a feature package enabled in second switch field value (e.g., a boolean value). In the embodiment of the present invention illustrated in FIG. 2, each of the data entries in the data record 200 include information for feature packages having different operational statuses in the first switch and the second switch. For example, as shown by data entry 210, the AMA for Type 2 Cellular feature package is enabled in the first switch and disabled in the second switch.

Embodiments of the present invention, such as data record 200, can advantageously help to eliminate errors when a new switch is being set up and/or activated. For example, a central office may be converted from an old switch to a new switch. Typically, the new switch should have at least the same features as the old switch, e.g., so that customers do not lose one or more services when a cutover is made to the new switch from the old switch. For example, if the old switch had a CallerID feature package loaded and enabled and the new switch did not have a CallerID feature package loaded and enabled, there can be customer complaints and dissatisfaction when a cutover is made to the new switch and customers no longer receive CallerID information. Embodiments of the present invention can identify differences in feature package operational status and thereby help bring new switches into an existing service environment and resolve problems from office conversions.

FIGS. 3A through 3I illustrate another embodiment of the present invention. A data record 300 can include feature package operations status information that indicates matches between a first set of feature package operational status information from a first switch and a second set of feature package operational status information from a second switch. For example, data record 300 includes feature package operational status information for feature packages loaded in each of a first switch and a second switch where the operational status of corresponding feature packages is the same, e.g., a feature package in one switch is enabled and a corresponding feature package in the other switch is likewise enabled.

Data record 300 can include a plurality of date entries such as data entry 310. Data entry 310 corresponds to a type of feature package loaded in each of the first switch and the second switch (e.g., a Caller ID—MultiLine feature package). Data entry 310 can include a plurality of data fields, where each data field can store a data value. In an embodiment, data entry 310 can include a feature package code field 312 to store a feature package code associated with a feature package, a feature package name field 314 to store a feature package name, a feature package enabled in first switch field 316 to store a feature package enabled in first switch field value (e.g., a boolean value), and a feature package enabled in second switch field 318 to store a feature package enabled in second switch field value (e.g., a boolean value).

A data record such as data record 300 can be based on a comparison between two switches to help determine what features may be needed for a third switch. For example, a new remote switch may be being configured. Comparing the feature packages loaded and enabled in two switches (e.g., two switches of the same vendor of the new remote switch, two local switches, two distant switches, a host of the new remote switch and a current remote of the host of the new remote switch, etc.) can identify the set of feature packages that are likely needed in the new remote switch.

As another example, a data record such as data record 300 can assist in a quick reload of Products/Services Inventory Management System ("P/SIMS") information in the event that feature information is accidentally erased, intentionally erased, and so on. P/SIMS is a switch software tracking and management system that is used after the "Right-to-Use" license has been purchased from the switch vendor to activate certain software products and feature packages based upon a lists of the switch vendor's available services at the switch's current level of its generic operating system. For example, in P/SIMS all features of a remote may be been deactivated (e.g., by error). Embodiments of the present invention can compare a host of the remote and another remote of the host to identify features in the remote that need to be activated. Alternatively, the feature package operational status information of the remote switch can be compared with the feature package operational status information of the host to identify the feature packages enabled in the host that need to be enabled in the remote.

FIG. 4 illustrates another embodiment of the present invention. A data record 400 can include feature package operations status information that indicates differences between a first set of feature package operational status information from a first switch and a second set of feature package operational status information from a second switch. For example, data record 400 includes feature package operational status information for feature packages loaded in each of the first switch and the second switch where the operational status of corresponding feature packages is different. Data record 400 can include a plurality of date entries such as data entry 410. Data entry 410 corresponds to a type of feature package loaded in each of the first switch and the second switch (e.g., an Application Service Provider ("ASP") Network Busy Event Remote Termination Unit ("RTU") feature package). Data entry 410 can include a plurality of data fields, where each data field can store a data value. In an embodiment, data entry 410 can include a feature package code field 412 to store a feature package code associated with a feature package, a feature package name field 414 to store a feature package name, a feature package enabled in first switch field 416 to store a feature package enabled in first switch field value (e.g., a boolean value), and a feature package enabled in second switch field 418 to store a feature package enabled in second switch field value (e.g., a boolean value).

Figure 5:
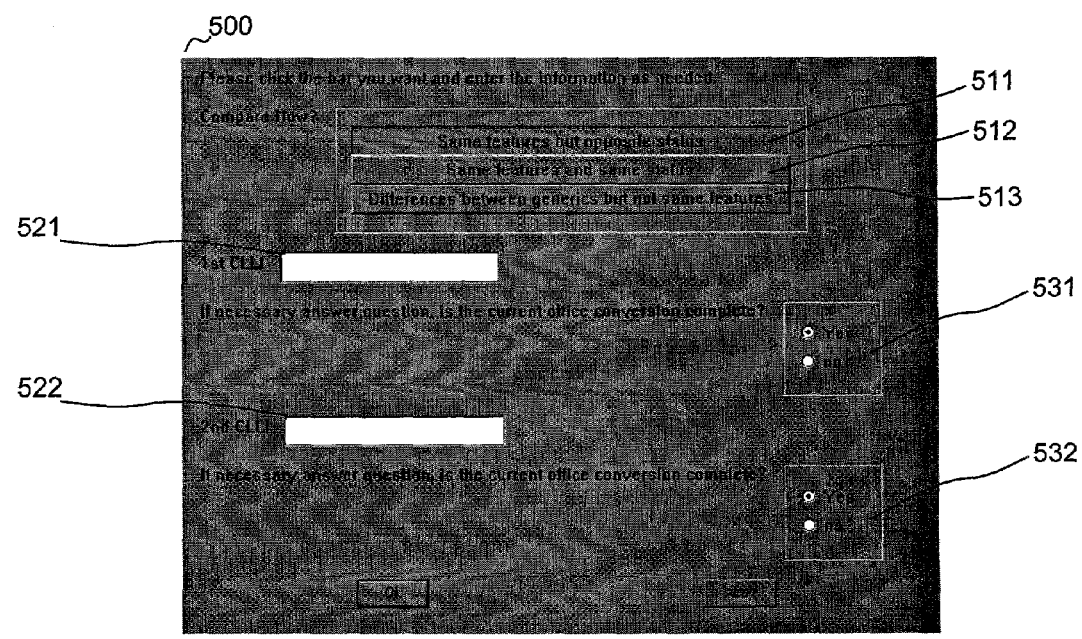
FIG. 5 is an illustration of a graphical user interface in accordance with an embodiment of the present invention.

FIG. 5 is an illustration of a graphical user interface ("GUI") in accordance with an embodiment of the present invention. A GUI 500 can prompt a user for information that specifies parameters of a feature package operational status information comparison. GUI 500 can include three comparison option boxes such as, for example, a same features but opposite status option box 511, a same features and same status option box 512, and a differences between generics but not same features box 513. In an embodiment of the present invention, feature package software modules are part of a generic software load of a switch, which can be purchased through a right-to-use license on an individual basis. A user can select one of option boxes 511–513 to specify a type of comparison to be performed between two switches. GUI 500 can also include two or more switch identifier input fields such as, for example, first switch identifier field 521 and second switch identifier field 522. For example, a switch identifier can be a Common Language Location Identifier ("CLLI") code. In an embodiment, a user can also specify whether one or both of the identified switches are part of an office conversion via office conversion indicator fields 531 and 532.

Figure 6:
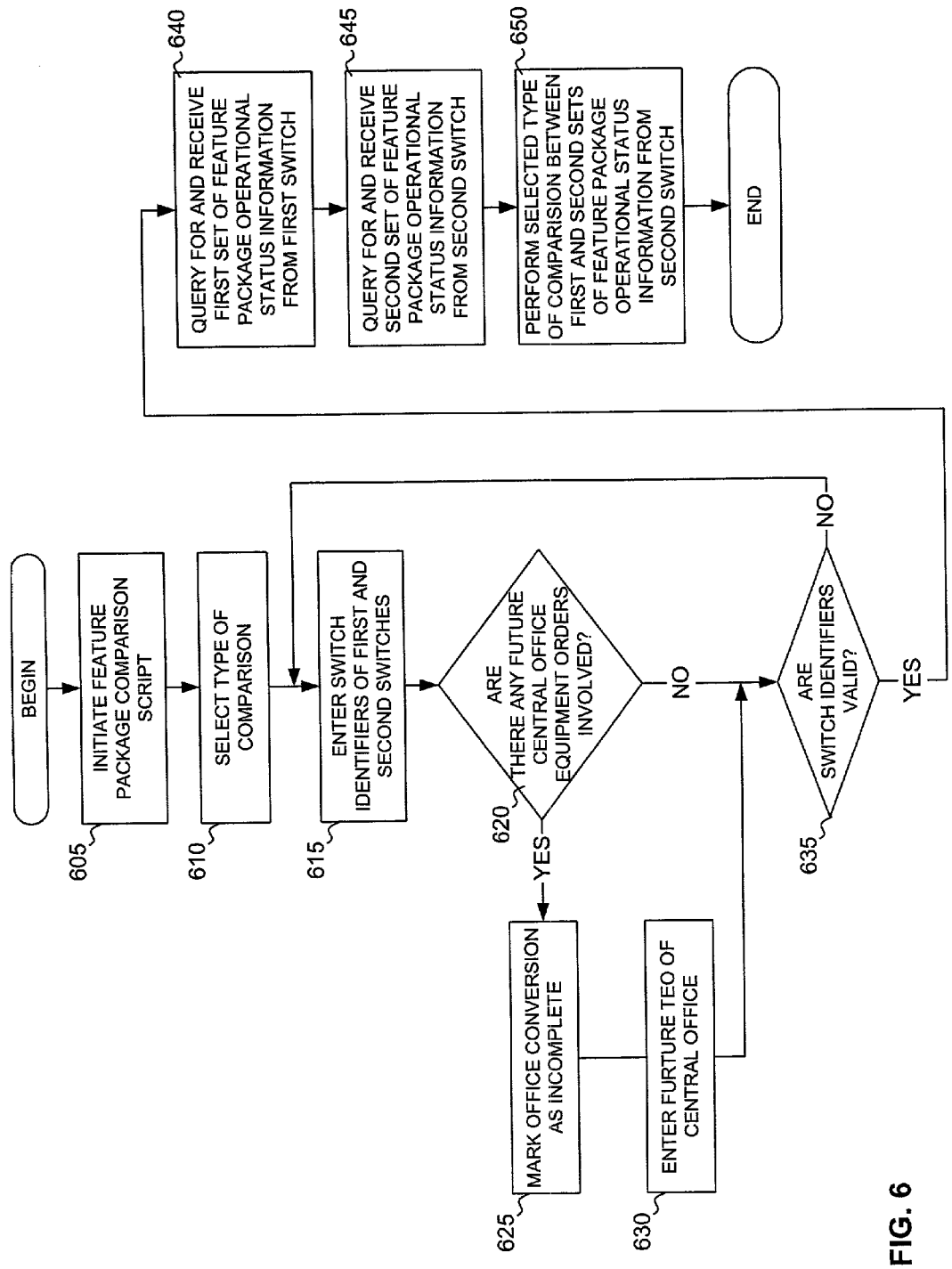
FIG. 6 is a flow diagram illustrating an embodiment of the present invention.

FIG. 6 is a flow diagram illustrating an embodiment of the present invention. A user can initiate (e.g., via a computer) a feature package comparison script (e.g., a software routine) (step 605). The user can select a type of comparison to be performed between two switches, e.g., a comparison to show features loaded in each switch that have different statuses, a comparison to show features loaded in each switch that have the same status, and a comparison to show features that are not loaded in both switches (step 610). The user can enter switch identifiers of a first switch and a second switch (step 615). Whether there are any future central office equipment orders involved with a central office associated with the first and/or second switch can be determined (decision 620). When there is a future central office equipment order involved with the first and/or second switch, the switch identifiers can be verified to determine whether they are valid (decision 635). When there is a future central office equipment order involved with the first and/or second switch, an office conversion incomplete status flag can be set (step 625), the user can enter a future telecommunications equipment order ("TEO") identifier of the central office equipment order (step 630), and the switch identifiers can be verified to determine whether they are valid (decision 635).

When one or more of the switch identifiers are not valid, the user can re-enter one or more switch identifiers (step 615). When the switch identifiers are valid, a first set of feature package operational status information can be queried for and received (step 640) and a second set of feature package operational status information can be queried for and received (step 645). The selected type of comparison between the first set and the second set of feature package operational status information can be performed.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions adapted to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions adapted to be executed. The terms "instructions adapted to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor. Appendix A contains an example of source code that can be used, among other things, to compare feature package operational status information of a first switch and a second switch.

Systems and methods in accordance with an embodiment of the present invention disclosed herein can advantageously compare feature package operational status information of two or more switches. Feature packages loaded in two switches but having different operational statuses can be identified. Feature packages loaded in two switches have the same operational status can also be identified. Embodiments of the present invention can advantageously identify feature package inconsistencies when switches are upgraded, replaced, reloaded, installed, and so on.

Embodiments of systems and methods to compare operational statuses of switch feature packages have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive.

What is claimed is:

1. A system for comparing feature package operational statuses of two or more switches in expanding a telecommunication network, the system comprising:
    an existing switch including a first set of feature packages;
    an additional switch including a second set of feature packages;
    a first set of feature package information from the existing switch;
    a second set of feature package information from the additional switch; and
    a computer coupled to the existing switch and to the additional switch to receive the first set of feature package information and the second set of feature package information to compare, side by side, the first set of feature package information with the second set of feature package information, to determine if a subset of feature packages that is loaded and enabled on the existing switch is identical to a subset of feature packages that are loaded and enabled on the additional switch, wherein the first and second sets of feature package information comprise a listing of the feature package identifiers corresponding to the sets of feature packages loaded onto the existing and additional switches, respectively, and an indication as to whether one or more feature packages are enabled or disabled.

2. The system of claim 1, wherein the existing switch is an existing first telecommunications switch and the additional switch is a additional telecommunications switch.

3. The system of claim 1, wherein the existing switch is a switch of a first central office and the additional switch is a switch of a second central office, the first central office serving a first service area, the second central office serving a second service area, the first service area being different from the second service area.

4. The system of claim 1, wherein the existing switch is an existing first host switch and the additional switch is a second host switch.

5. The system of claim 1, wherein the existing switch is a host switch and the additional switch is a remote switch of the host switch.

6. The system of claim 1, wherein the computer is to receive an existing switch identifier corresponding to the existing switch and an additional switch identifier corresponding to the additional switch.

7. The system of claim 6, wherein the existing switch identifier is a first common language location identifier ("CLLI") and the additional switch identifier is a second CLLI.

8. The system of claim 1, wherein the computer is to identify one or more feature packages having a first operational status in the existing switch and a second operational status in the additional switch, the first operational status being different from the second operational status.

9. The system of claim 8, wherein the first operational status is one of enabled and not enabled and the second operational status is the other of enabled and not enabled.

10. The system of claim 1, wherein the computer is to identify one or more feature packages having an operational status in the existing switch and the operational status in the additional switch.

11. The system of claim 10, wherein the operational status is enabled.

12. The system of claim 10, wherein the operational status is not enabled.

13. The system of claim 1, wherein the computer is to identify one or more feature packages of the first set of feature packages that are not included in the second set of features packages.

14. A method for replacing an existing switch by comparing feature package operational statuses of the existing switch and one or more replacement switches, the method comprising:
    installing and programming one or more replacement switches;
    querying for and receiving an existing switch identifier associated with an existing switch;
    querying for and receiving a one or more replacement switch identifier associated with one or more replacement switches;
    receiving a first set of feature package information associated with the existing switch;
    receiving at least a second set of feature package information associated with the one or more replacement switches, wherein the first and second sets of feature package information comprise a listing of the feature package identifiers corresponding to the feature packages loaded onto the existing and the one or more replacement switches respectively, and an indication as to whether the one or more feature packages are enabled or disabled;
    comparing the first set of feature package information with the second set of feature package information to determine a common subset of feature packages existing on both the existing and replacement switches;
    identifying one or more feature packages having a operational status in the one or more replacement switches that is different from the operational status in the existing switch;
    conforming the set of one or more feature packages and their operating status on the one or more replacement switches to the feature packages and their operating status on the existing switch; and
    disconnecting the existing switch.

15. The method of claim 14, wherein the existing switch is a switch of a first central office and the one or more replacement switches is a switch of a second central office, the first central office serving a first service area, the second central office serving a second service area, the first service area being different from the second service area.

16. The method of claim 14, wherein the existing switch is a first telecommunications switch and the one or more replacement switches is a telecommunications switch.

17. The method of claim 14, wherein the existing switch is a first remote switch and the one or more replacement switches is a second remote switch.

18. The method of claim 14, wherein the computer is to receive an existing switch identifier corresponding to the existing switch and the one or more replacement switch identifiers corresponding to the one or more replacement switches.

19. The system of claim 18, wherein the existing switch identifier is a first common language location identifier ("CLLI") and the one or more replacement switch identifiers is a second CLLI.

20. The system of claim 14 wherein the operational status is selected from the group consisting of enabled and not enabled.

21. A system for obtaining comprehensive feature package operational statuses of one or more switches comprising:
one or more telecommunications switches, the one or more telecommunications switches each including a first plurality of feature packages;
a communications network coupled to the one or more telecommunications switches; and
a computer coupled to the communications network and executing a plurality of instructions via a processor for querying the one or more telecommunication switches and obtaining a feature package operational status for each of the one or more switches, the computer including a feature package comparison data record wherein the feature package comparison data record contains feature package information and comprises:
a feature package identifier field storing a feature package identifier corresponding to a feature package loaded onto a switch; and
a feature package operational status identifier field storing a feature package operational status identifier indicating whether the package is enabled or disabled.

22. The system of claim 21, wherein the feature package comparison data record is based at least in part on a first set of feature package information and at least a second set of feature package information.

23. A method for obtaining and comparing feature package operational statuses of two or more switches, the method comprising:
prompting a user to enter a first switch identifier and a second switch identifier, the first switch identifier associated with a first switch, and the second switch identifier associated with a second switch;
directing a first query to the first switch based at least in part on the first switch identifier;
directing a second query to the second switch based at least in part on the second switch identifier;
receiving a complete first set of feature package information based at least in part on the first query;
receiving a complete second set of feature package information based at least in part on the second query; and
comparing, side by side, the complete first set of feature package information with the complete second set of feature package information to determine if a subset of feature packages that are loaded and enabled on the first switch is identical to a subset of feature packages that are loaded and enabled on the second switch, wherein the first and second sets of complete feature package information comprise a listing of the feature package identifiers corresponding to the feature packages loaded onto the first and second switches, respectively, and an indication as to whether one or more feature packages are enabled or disabled.

24. The method of claim 23, wherein comparing the complete first set of feature package information with the complete second set of feature package information includes identifying one or more feature packages having a first operational status in the first switch and a second operational status in the second switch, the first operational status being different from the second operational status.

25. The method of claim 23, wherein comparing the complete first set of feature package information with the complete second set of feature package information includes identifying one or more feature packages having an operational status in the first switch and the operational status in the second switch.

26. The method of claim 23, wherein comparing the complete first set of feature package information with the complete second set of feature package information includes identifying one or more feature packages of the complete first set of feature packages that are not included in the complete second set of features packages.

27. The method of claim 23, wherein prompting a user to enter a first switch identifier and a second switch identifier includes prompting the user via a graphical user interface including a first switch identifier field and a second switch identifier field.

28. A system for comparing feature package operational statuses of two or more switches, the system comprising:
means for receiving a first switch identifier, the first switch identifier associated with a first switch;
means for receiving a second switch identifier, the second switch identifier associated with a second switch;
means for receiving a first set of feature package information, the first set of feature package information associated with the first switch;
means for receiving a second set of feature package information, the second set of feature package information associated with the second switch; and
means for comparing side by side the first set of feature package information with the second set of feature package information to determine if a subset of feature packages that are loaded and enabled on the first switch is identical to a subset of feature packages that are loaded and enabled on the second switch, wherein the first and second sets of feature package information comprise a listing of the feature package identifiers corresponding to the feature packages loaded onto the first and second switches, respectively, and an indication as to whether one or more feature packages are enabled or disabled.

29. The system of claim 28, further comprising means for verifying the validity of the first switch identifier and the second switch identifier.

30. The system of claim 29, further comprising means for prompting a user to enter a first switch identifier and a second switch identifier.

31. The system of claim 30, wherein the means for prompting includes a graphical user interface.

32. The system of claim 31, wherein the means for prompting includes a means for prompting a user to select a type of comparison.

33. The system of claim 32, wherein the means for prompting includes a means for prompting a user to indicate whether an office conversion is complete, the office conversion associated with at least one of the first switch and the second switch.

34. The system of claim 33, wherein the means for prompting includes a means for prompting a user to enter a telephone equipment order identifier associated with the office conversion.

35. The system of claim 28, wherein the first switch and the second switch are from the same switch manufacturer.

36. The system of claim 28, wherein the first switch and the second switch are the same type of switch from a switch manufacturer.

37. The system of claim 28, wherein the first switch is a replacement switch for the second switch.

38. The system of claim 28, wherein the means for comparing includes means for identifying one or more feature packages having a first operational status in the first switch and a second operational status in the second switch, the first operational status being different from the second operational status.

39. The system of claim 28, wherein the means for comparing includes means for identifying one or more feature packages having an operational status in the first switch and the operational status in the second switch.

40. The system of claim 28, wherein the means for comparing includes means for identifying one or more feature packages of the first set of feature packages that are not included in the second set of features packages.

41. A method for comparing feature package operational statuses of two or more switches employed in expanding a telecommunication network, the method comprising:
   a step for receiving a first switch identifier, the first switch identifier associated with a first switch;
   a step for receiving an additional switch identifier, the second switch identifier associated with an additional switch;
   a step for receiving a first set of feature package information, the first set of feature package information associated with the first switch;
   a step for receiving a second set of feature package information, the second set of feature package information associated with the additional switch; and
   a step for comparing, side by side, the first set of feature package information with the second set of feature package information to determine if a subset of feature packages that are loaded and enabled on the first switch is identical to a subset of feature packages that are loaded and enabled on the additional switch, wherein the first and second sets of feature package information comprise a listing of the feature package identifiers corresponding to the feature packages loaded onto the first and additional switches, respectively, and an indication as to whether one or more feature packages are enabled or disabled.

42. The method of claim 41, wherein the step for comparing includes a step for identifying one or more feature packages having a first operational status in the first switch and a second operational status in the additional switch, the first operational status being different from the second operational status.

43. The method of claim 41, wherein the step for comparing includes a step for identifying one or more feature packages having an operational status in the first switch and the operational status in the additional switch.

44. The method of claim 41, wherein the step for comparing includes a step for identifying one or more feature packages of the first set of feature packages that are not included in the second set of features packages.

45. A computer-readable medium storing a plurality of instructions to be executed by a processor for comparing feature package operational statuses of two or more switches, the plurality of instructions comprising instructions to:
   receive a first switch identifier, the first switch identifier associated with a first switch;
   receive a second switch identifier, the second switch identifier associated with a second switch;
   receive a first set of feature package information, the first set of feature package information associated with the first switch;
   receive a second set of feature package information, the second set of feature package information associated with the second switch; and
   compare, side by side, the first set of feature package information with the second set of feature package information to determine if a subset of feature packages that are loaded and enabled on the first switch is identical to a subset of feature packages that are loaded and enabled on the second switch, wherein the first and second sets of feature package information comprise a listing of the feature package identifiers corresponding to the feature packages loaded onto the first and second switches, respectively, and an indication as to whether one or more feature packages are enabled or disabled.

46. The computer-readable medium of claim 45, wherein the instructions to compare include instructions to identify one or more feature packages having a first operational status in the first switch and a second operational status in the second switch, the first operational status being different from the second operational status.

47. The computer-readable medium of claim 45, wherein the instructions to compare include instructions to identify one or more feature packages having an operational status in the first switch and the operational status in the second switch.

48. The computer-readable medium of claim 45, wherein the instructions to compare include instructions to identify one or more feature packages of the first set of feature packages that are not included in the second set of features packages.

* * * * *